United States Patent [19]

Delcour et al.

[11] Patent Number: 5,658,606
[45] Date of Patent: Aug. 19, 1997

[54] RYE EXTRACT BREAD-MAKING ADDITIVES AND METHOD OF USE THEREOF

[75] Inventors: Jan A. Delcour, Haverlee, Belgium; R. C. Hoseney, Manhattan, Kans.

[73] Assignee: Kansas State University Research Foundation, Manhattan, Kans.

[21] Appl. No.: 308,125

[22] Filed: Sep. 19, 1994

[51] Int. Cl.$^6$ .................... A23J 1/12; A23J 3/14; A21D 2/26

[52] U.S. Cl. ............ 426/62; 426/549; 426/653; 426/436; 426/656; 530/372

[58] Field of Search .................. 426/62, 549, 653, 426/436, 656; 530/372

[56] References Cited

FOREIGN PATENT DOCUMENTS 1332903  9/1970  Luxembourg.

OTHER PUBLICATIONS

Delcour et al Cereal Chemistry, vol. 68(1) pp. 72–76, (1991).
Preston et al Cereal Chemistry, vol 52 (5) pp. 719–726, (1975).
Casier et al.; Einfluβ der wasserunlöslichen Weizen–und Roggen–Pentosane auf die Backeigenschaften von Weizenmehlen und anderen Rohstoffen; pp. 36–44; Jan. 1973.
Casier et al.; Die wasserunlöslichen Pentosane aus Roggen and Weizen und ihr Einfluβ auf die Backwerte; Seite 46; Getreide und Mehl; Heft Apr. 1967.
Jorgensen; Studies on the Nature of the Bromate Effect; pp. 193–223 (1945).
Belitz et al.; Food Chemistry; 15 Cereals and Cereal Products; pp. 518–520, 1979.
Hoseney; Principles of Cereal Science and Technology; Yeast–Leavened Products; pp. 230–273, 1989.
Kuninori et al.; Dehydro–L–Ascorbic Acid Reducing System in Flour; Jan., 1964; vol. 41, pp. 39–46.
Kuninori et al.; Glutathione in Wheat and Wheat Flour; Jul., 1964, pp. 253–259.
Finney et al.; A Ten–Gram Mixograph for Determining and Predicting Functional Properties of Wheat Flours; Apr., 1972—The Bakers Digest; pp. 32–43.
Finney; An Optimized, Straight–Dough, bread–making Method After 44 Years; Cereal Chem. 61(1):20–27 (1984).
Shogren et al.; Bread–Making Test for 10 Grams of Flour; Cereal Chem. 61(5):418–423 (1984).
Vanhamel et al.; A Volumeter for Breads Prepared from 10 Grams of Flour; Cereal Chem.68(2):170–172 (1991).
Delcour; Physico–Chemical and Functional Properties of Rye Nonstarch Polysaccharides. I. Colorimetric Analysis of Pentosans and Their Relative Monosaccharide Compositions in Fractionated (Milled) Rye Products; Cereal Chem. 66(2):107–111 (1989).
Lai et al.; Functional Effects of Shorts in Breadmaking; Cereal Chem. 66(3):220–223 (1989).
Krishchenko et al.; Fractional Composition and Amino Acid Makeup of Readily Soluble Proteins of Rye Grain; 633.14:581.134.4 (1980).
Krishchenko et al.; 633. 14:581.134.4 (1981).
Scopes, Protein Purification:Principles & Practice (Springer Adv. Textin Chem.), 1982, pp. 164, 172–177.
Preston et al CAB Abstracts: 760741411 Cereal Chemistry, vol. 52(5)(Abstract only), 1975, pp.719–726.
Krishchenko et al CAB Abstracts:820743312 Kafelna Agronomic and Biol. Kline, 1982 (Abstract only).

Primary Examiner—Steven Weinstein
Assistant Examiner—Choon P. Koh
Attorney, Agent, or Firm—Hovey, Williams, Timmons & Collins

[57] ABSTRACT

Improved rye-derived bread improvers are provided which can be incorporated into otherwise conventional wheat-based doughs to give increases in loaf volume and crumb quality. The improvers include a water soluble alkaline proteinaceous specie derived from rye and having a pI of greater than about 7.5; the improvers are prepared by aqueous extraction from whole rye meal and subsequent separation of the alkaline proteinaceous species.

16 Claims, No Drawings

RYE EXTRACT BREAD-MAKING ADDITIVES AND METHOD OF USE THEREOF

BACKGROUND OF THE INVENTION

1. Field of the invention

The present invention is broadly concerned with rye-derived bread improvers which can be incorporated into otherwise conventional wheat flour bread to give improved baked bread having increased loaf volumes and improved crumb quality. More particularly, the invention pertains to bread improvers in the form of one or more water soluble alkaline proteinaceous species derived from rye and having a pI of greater than about 7.5. In preferred forms, the improvers of the invention give at least about a 2% increase in loaf volume and improved crumb grain.

2. Description of the Prior Art

Wheat is a unique cereal which is widely used for the production of bread with good loaf volume and crumb grain. Indeed, when wheat flour is mixed with water and yeast, a dough develops due to the special properties of the wheat storage proteins, i.e., the so-called gluten.

The properties of the gluten network determine the quality of the resulting bread. The right gluten characteristics lead to a well manageable dough with optimum visco-elastic and gas retention properties and, finally, to a bread of high volume and a correct crumb structure. While the quantity and the quality of the gluten proteins are important in breadmaking, the presence of a number of enzymes, lipids and other constituents is also important for the quality of wheat flour for bread-making (Hoseney, 1994).

In areas where wheat is grown, plant breeders have developed wheat varieties that are suitable for breadmaking. Furthermore, cereal chemists around the world have investigated the precise role of cereal constituents in breadmaking and ways to improve several aspects of bread quality, such as bread volume and crumb structure, crumb softness, springiness and staling. Such efforts have resulted in the introduction of a number of enzymes, fats, emulsifiers, oxidants as well as reducing agents and other components in breadmaking recipes The improving effect of oxidants is well known. Commonly used improvers such as potassium bromate and azodicarbonamide are both strong oxidants. However, potassium chlorate, apparently an even stronger oxidant than potassium bromate, has no effect in breadmaking. Therefore, the evidence that the positive effect found in breadmaking is a mere oxidation is not really definitive. Joergensen (1945) found that ascorbic acid, a strong reducing agent, has an oxidative effect on bread dough. It has been shown that ascorbic acid does not have an oxidizing effect on dough if it is mixed in an atmosphere of nitrogen and, therefore, it is presumed that the ascorbic acid is oxidized by oxygen and that ascorbic acid oxidase is invoked in this process. Another enzyme heretofore described is one that oxidizes sulphydryl compounds to disulfides with dehydroascorbic acid (Belitz and Grosch, 1986; Kuninori and Matsumoto, 1964a). This enzyme is only active with glutathione in the flour (Kuninori and Matsumoto, 1964b). It is clear that if glutathione is added to white flour, the loaf volume is greatly decreased and the loaf looks underoxidized. The effect can be reversed by addition of an oxidant such as potassium iodate (Lai et al., 1989).

In general, it is believed that compounds such as glutathione, cysteine, ascorbic acid, potassium bromate, azodicarbonamide and others have an impact on the ratio between thiol and disulfide moieties in dough, and, hence, on its quality. Furthermore, some scant evidence indicates that, in some instances, enzymes may play an important role in the processes that eventually lead to the bread improving effects.

Thus, while considerable research has been done on various bread additives, the complex chemistry involved is often not fully understood. Moreover, certain types of known chemical bread improvers, and especially potassium bromate, are subject to increasingly stringent governmental regulations. It has been suggested that potassium bromate may in the near future be banned from use in bread doughs. Therefore, there is a need in the art for bread improvers which are derived from naturally occurring sources, and preferably grain sources.

SUMMARY OF THE INVENTION

The present invention provides a bread improver which can be used in a variety of wheat-based bread doughs to improve both loaf volumes and crumb quality. Broadly speaking, the improver of the invention comprises a water soluble alkaline proteinaceous specie derived from rye and having a pI (i.e, –log of the isoelectric point) of greater than about 7.5. In use, the improver of the invention should give at least about a 2% increase in loaf volume when tested according to American Association of Cereal Chemists (A.A.C.C.) test 10–10B. In preferred forms, this loaf volume increase should be greater than about 5%.

In general, the bread improvers of the invention are prepared by first providing a quantity of whole rye meal and then subjecting the meal to an aqueous extraction to obtain a water soluble proteinaceous fraction including the specific improver specie(s). This specie(s) is then recovered, typically by separation techniques tending to separate the water soluble alkaline proteinaceous species.

Normally, the starting rye meal should have a fine grind, and this meal is then contacted with an amount of water ranging from about 2–10 liters per kilogram of rye meal, more preferably from about 2–6 liters of water per kilogram of meal. Thereafter, the rye meal-water mixture is agitated for a period of from about 1–6 hours. In order to most efficiently separate the desired water soluble proteinaceous fraction, the mixture is advantageously centrifuged and then filtered. In final processing, positively charged proteinaceous species are separated, typically through use of anion exchange chromatography or isoelectric focusing. In any case, the resultant bread improver is typically in the form of an aqueous proteinaceous mixture containing a variety of particular proteins. The specific protein or proteins responsible for the bread improving effects of the invention have not been identified.

In use, the protein improvers of the invention are mixed with dough ingredients normally including wheat flour, water and yeast. The preferred aqueous improver mixture of the invention is normally used at a level of up to about 6% baker's weight, i.e., based upon the amount of wheat flour in the dough taken as 100% by weight; this level of use is more preferably from about 0.1–4% by weight.

DETAILED DESCRIPTION OF THE PREFERRED EMBODIMENT

The following examples set forth preferred techniques for the preparation of bread improvers in accordance with the invention, as well as use thereof in bread doughs for the production of improved baked products. In should be understood that these examples are provided by way of illustration only, and nothing therein should be taken as a limitation upon the overall scope of the invention.

EXAMPLES

Materials

In the following examples, the rye used was from the European cultivar Danko, grown in the province Limburg of Belgium. Where appropriate, rye kernels were hand cleaned to remove foreign and broken grains.

Wheat flours used included a North American commercial malted flour obtained from Cargill Co. of Wichita, Kans. European wheat flour produced from the wheat variety Rector, grown in Belgium and milled using a Buhler MLU-202 milling device, as well as two commercial European wheat flours marked under the name of Uno and Surbi.

The diethylaminoethyl cellulose (DEAE-cellulose) was obtained from Merck (Darmstadt, Germany). Catalase was obtained from *Aspergillus niger* (Sigma, St. Louis, Mo.). All other chemicals used were of at least analytical grade.

Breadmaking

Baking absorption levels and mixing times were determined by the mixograph procedure (Finney and Shogren, 1972). Breads were produced by the ten gram breadmaking procedure of Shogren and Finney (1984). Fermentation was with 0.076 gram of dried yeast (Fermipan, Gist, Brocades, Delft, The Netherlands). The recipe contained 6.0% sucrose, 4.0% nonfat dried milk, 3.0% shortening (Crisco, Procter & Gamble, Cincinnati, Ohio, and 1.5% salt. The percentages are based on the flour weight at 14% moisture. The fermentation process (180 min., three punchings, 85% relative humidity, 30° C.) was followed by a 57 min. pan rise under the same conditions. Breads were baked for 13 min. at 450° F. All breads were produced in triplicate. Certain loaves were also baked using 100 g of flour and following A.A.C.C. method 10–10B.

Where rye extracts were tested (levels up to 4.0% of the flour weight) such extracts replaced an equal weight of wheat flour. Volumes were determined by rapeseed (Shogren and Finney, 1984) or glass bead (Vanhamel et al., 1991) displacement.

Isolation of Active Factor From Rye

1. Rye Milling

The rye kernels were ground with a DDD President Mill (Ieper, Belgium) to produce wholemeal or by a Buhler MLU-202 laboratory milling device as described by Delcour et al. (1989).

2. Extraction of the Active Rye Extracts

Procedure A.

In this procedure, the initial starting material was rye wholemeal produced from rye kernels that had been previously boiled for 90 min. in ethanol and that, subsequently, had been air dried. Rye wholemeal (1.00 kg) was mixed with water (4.0 liters) in a Hobart type mixer at room temperature for 240 min. the mixture was centrifuged at 1360 g during 30 min. The obtained supernatant filtered through paper with a Buchner funnel. To the clear extract, two volumes of ethanol were slowly added (over a 15 min. period) at room temperature. The precipitate was allowed to settle at 5° C. overnight and was recovered by centrifugation for 10 min. at 3400 g. The precipitate was then dried by repeated washings with ethanol and subsequently with diethyl ether with intermediate vacuum filtration. The diethyl ether was evaporated at room temperature and the diethyl ether odor-free extract was transferred to a closed vessel until used.

Procedure B.

This procedure was the same as Procedure A, but with a 10 min. boiling and subsequent cooling (to room temperature) step of the Buchner filtered extract prior to the ethanol precipitation step.

Procedure C.

The material obtained in Procedure A (5.0 g) was dissolved in 300 ml 1.0N sodium hydroxide, flushed with nitrogen and stored for 144 hrs. at room temperature. It was then dialyzed and recovered by ethanol precipitation and ethanol and diethyl ether washings as in Procedure A.

Procedure D.

This procedure was the same as Procedure A, but with rye wholemeal prepared from rye kernels not boiled in ethanol.

Procedure E.

In the Procedure A protocol, instead of recovering the active components by precipitation in the clear extract with ethanol, the clear extract was dialyzed for 48 hours in the cold room (5° C.), shell frozen and lyophilized.

Procedure F.

Procedure D was followed starting from rye kernels, not kernels boiled in ethanol.

Procedure G.

Using the Procedure A, the water soluble material was separated from rye wholemeal by shaking one portion of meal with four portions of deionized water for 4 hrs. at 5° C. After centrifugation (30 min., 1,000 g, 4° C.), the supernatant was dialyzed against deionized water (5° C., 48 hrs.), shell frozen and freeze-dried.

Separation of the Rye Extracts

1. Anion Exchange Chromatography

DEAE-cellulose used for batch separations was washed with HCl (0.5N), NaOH (0.5N), and preequilibrated with buffer (tris-HCl buffer, pH 8.5, 0.0147N). In order to work under optimum conditions, the saturation point of the DEAE-cellulose was determined with dialyzed supernatant obtained according to Procedure G.

In the actual treatment of dialyzed Procedure G supernatant (1,500 ml), the DEAE-cellulose (resulting from 350 g of DEAE-cellulose) was added and the mixture stirred for 60 min. at 5° C. The supernatant was recovered by centrifugation (1,520 g. 15 min., 4° C.). The DEAE-cellulose, with the adsorbed components, was stirred for another 30 min. with the described buffer of low ionic strength and centrifuged (1,520 g, 15 min., 4° C.). Both obtained supernatant fractions were combined, dialyzed for 48 hrs. in the cold room (5° C.), shell frozen and lyophilized. Acid proteins were desorbed with 1.0N sodium chloride at 5° C., the desorbate was then removed from DEAE-cellulose by centrifugation at 1,520 g for 15 min. (4° C.), dialyzed for 48 hrs. in the cold room and then lyophilized as above.

2. Ammonium Sulfate Precipitation

Dialyzed procedure G supernatant was stepwise treated with ammonium sulfate in the cold room (5° C.) with intermediate removal of precipitated material at 30%, 40%, 50%, 60% and 70% saturation level. After each addition of ammonium sulfate, the precipitate was allowed to form at 5° C. overnight and a centrifugation step (10,000 g, 30 min.) was performed to recover the material. It was then dissolved in deionized water, dialyzed at 5° C. during 48 hrs., shell frozen and lyophilized.

3. Isoelectric Focusing

Isoelectric focusing (IEF) was performed by a Phast System with Phast Gel IEF 3–9 (43×50×0.35 mm;

Pharmacia, Uppsala, Sweden). Separation conditions were as recommended by the manufacturer. Gels were silver stained according to the procedure described by Pharmacia.

Results

1. Extract Yields

Typical extract yields were 40.0 g dry matter per kg of rye in Procedures A and B. In Procedure C, 4.6 g of material was recovered. Where dialysis was used instead of ethanol precipitation dry matter recovered was approximately 45.0 g per kg of rye (e.g. Procedure G).

2. Breadmaking with Total Extracts

Table I presents the results of baking experiments in terms of bread volumes. From these results, it was clear that the selected rye extracts were potent bread improvers. It was originally thought that its effect was due to the presence of pentosan material. Indeed, with procedures such as Procedure A, one can expect pentosan material to be the most predominant components of the extract. However, it was evident that, whatever be the exact mechanism of the bread improving effect, in addition to the volume enhancing effect, it could be described in terms of improvement of dough handling properties and in terms of an oxidative action. Indeed, addition of the extract resulted in a visual appearance of the bread that could be mistaken for that resulting from addition of oxidants in the breadmaking recipe.

Thus, the bread corners were less sharp, the crumb grain had more elongated and more uniform cells and had a whiter appearance, all indicative of oxidative effects.

Breads containing rye extracts isolated according to Procedure B were next produced and it was repeatedly found that the additional heating step resulted in the loss of all activity (Table II).

This led to the conclusion that the ethanol boiling step (with a different solvent, intact rye kernels, and a lower temperature) had not destroyed the active component. The fact that boiling of the water soluble extract destroyed all bread improving effects strongly suggested that the improving was not due to the presence of pentosans. Indeed, it is well known that, in contrast to physiologically active proteins, pentosans do not lose their physico-chemical properties as a result of heating. It was also observed that, when deproteinizing the extract in Procedure C by an alkaline treatment, all effects were lost as well. The fact that the bread additives were unstable under alkaline conditions proved that they must be different from the water insoluble rye pentosan isolated earlier by Casier (1967, 1973).

The above results suggested that a protein was involved in the mechanism of the bread improver. Accordingly, the isolation procedure was to make it more suited for isolation of active protein material by omitting the rye kernel boiling step (Procedure D) and/or the ethanol precipitation step (Procedures F and E, respectively).

3. Breadmaking with Anion Exchange Derived Fractions

The results of the baking experiments using the extracts derived from Procedure G are shown in Table III. Only the supernatant fraction from the DEAE-cellulose gave a volume increase and this increase was more pronounced at the 1% level than at the 2% level. The ion exchange treatment resulted in a volume increased by the supernatant fraction at the 1% level in excess of that of the total fraction at a 2% level. This implies that an enrichment of the active factor had taken place. It was therefore concluded that the ion exchange batch method is useful for enrichment of the active factor. Analysis by IEF revealed that the supernatant fraction was enriched in alkaline protein material (pI>7.5) when compared to the total extract).

4. Breadmaking with Fractions Obtained by Ammonium Sulfate Precipitation

The fractions obtained at 30%, 40% and 50% saturation of ammonium sulfate was shown to be active in the baking experiments (See Table IV). Analysis of the fractions by IEF showed that they had the largest content in basic proteins but also that they still contained a proportion of acidic proteins. From Table IV, it is equally clear that, at the 2% level the cited fractions gave a volume decrease and that the breads were overoxidized. The breads with the precipitate after 40% saturation and added at the 1% level showed the best degree of oxidation. A volume dosage curve was also established for the 30% fraction. For this fraction, a maximum volume increase was obtained at the 0.5% substitution level. These data therefore clearly show that ammonium sulfate also can be an effective tool for concentrations of the active protein material and confirms the belief that the active material is an alkaline protein fraction.

5. Breadmaking with Extracts Isolated from Rye Milling Streams

Rye kernels were milled with a Buhler MLU-202 laboratory mill as described by Vanhamel et al. (1991). After passage through the mill, the B- and C-fractions were recombined into one B- and one C-fraction yielding 29.0 and 18.0% of milled material, respectively. Shorts and bran fractions represented 24.0 and 29.0%. From these materials, the active fractions were isolated according to Procedure G, and breads were produced with the resulting material. Results are presented in Table V. These results clearly show that separation by milling is another useful method to separate the extract in active and nonactive components. It is of note that the volume increases of the breads could again be described in terms of oxidation effects. Shorts and bran definitely contained basic proteins as shown by IEF.

6. Mechanism of Bread Quality Improvement

Further baking results (Table VI) showed that the activity of the Procedure G extract is additive to that of potassium bromate, but not to that of ascorbic acid. Also, when baked in a 100 g breadmaking procedure (Table VII) in the presence or absence of catalase, the rye extract does not work by a mechanism in which it produces hydrogen peroxide.

TABLE I

Volumes (% of Control) of Breads Produced from (10 − xg) Grams of North American Wheat Flour and With Varying Quantities (x Grams) of Rye Water Soluble (RWS) Extract Isolated Acording to Procedure A

| Flour Sample | Quantity of Flour (Grams) | Quantity of RWS (Grams) | Volume (%) |
| --- | --- | --- | --- |
| 1 | 10.0 | 0.0 | 100.0 |
| 1 | 9.9 | 0.1 | 113.0 |
| 1 | 9.8 | 0.2 | 118.8 |
| 1 | 9.6 | 0.4 | 108.7 |
| 2 | 10.0 | 0.0 | 100.0 |
| 2 | 9.8 | 0.2 | 111.0 |
| 3 | 10.0 | 0.0 | 100.0 |
| 3 | 9.8 | 0.2 | 118.8 |
| 4 | 10.0 | 0.0 | 100.0 |
| 4 | 9.8 | 0.2 | 112.0 |
| 5 | 10.0 | 0.0 | 100.0 |
| 5 | 9.8 | 0.2 | 107.0 |

TABLE II

Volumes (% of Control) of Breads Produced from 10.0 or 9.8 Grams of North American (Sample 6) or European (Samples 7 and 8) Wheat Flours, and 0 or 0.2 Grams of Rye Water Soluble (RWS) Extract Isolated According to Procedures A–F

| Flour Sample | Flour (Grams) | RWS (Grams, Procedure) | | Volume (%) |
|---|---|---|---|---|
| 6 | 10.0 | 0.0 | — | 100.0 |
| 6 | 9.8 | 0.2 | B | 100.7 |
| 6 | 9.8 | 0.2 | C | 90.5 |
| 7 | 10.0 | 0.0 | — | 100.0 |
| 7 | 9.8 | 0.2 | A | 108.7 |
| 7 | 9.8 | 0.2 | D | 112.0 |
| 7 | 9.8 | 0.2 | E | 109.6 |
| 7 | 9.8 | 0.2 | F | 119.0 |
| 8 | 10.0 | 0.0 | — | 100.0 |
| 8 | 9.8 | 0.2 | A | 103.0 |
| 8 | 9.8 | 0.2 | D | 109.0 |
| 8 | 9.8 | 0.2 | E | 106.0 |
| 8 | 9.8 | 0.2 | F | 109.0 |

TABLE III

Volumes (% of Control) of Breads Produced from (10 − x) Grams of European Wheat Flour (Samples 9), and x Grams of Rye Water Soluble (RWS) Extract Isolated According to Procedures G and Further Fractionated by Anion Exchange Chromatography into Supernatant and Desorbate

| Quantity of Flour (Grams) | Isolation of RWS | Quantity of RWS (Grams) | Volume (%) |
|---|---|---|---|
| 10.0 | — | 0.0 | 100.0 |
| 9.8 | Procedure G | 0.2 | 108.7 |
| 9.975 | Supernatant | 0.025 | 100.2 |
| 9.95 | Supernatant | 0.05 | 106.2 |
| 9.9 | Supernatant | 0.10 | 111.9 |
| 9.85 | Supernatant | 0.15 | 106.2 |
| 9.8 | Supernatant | 0.2 | 102.4 |
| 9.9 | Desorbate | 0.1 | 97.5 |
| 9.8 | Desorbate | 0.2 | 91.7 |

TABLE IV

Volumes (% of Control) of Breads Produced from (10 − x) Grams of European Wheat Flour (Samples 10), and x Grams of Rye Water Soluble (RWS) Extract Isolated from Dialyzed Procedures G Extract by Stepwise Addition of Ammonium Sulfate (Am. Sulf.)

| Quantity of Flour (Grams) | Isolation of RWS | Quantity of RWS (Grams) | Volume (%) |
|---|---|---|---|
| 10.0 | — | 0.0 | 100.0 |
| 9.9 | 30% Am. Sulf. | 0.1 | 114.7 |
| 9.8 | 30% Am. Sulf. | 0.2 | 82.0 |
| 9.9 | 40% Am. Sulf. | 0.1 | 116.6 |
| 9.8 | 40% Am. Sulf. | 0.2 | 92.0 |
| 9.9 | 50% Am. Sulf. | 0.1 | 112.7 |
| 9.9 | 60% Am. Sulf. | 0.1 | 95.3 |
| 9.8 | 60% Am. Sulf. | 0.2 | 90.0 |
| 9.9 | 70% Am. Sulf. | 0.1 | 96.5 |
| 9.8 | 70% Am. Sulf. | 0.2 | 86.9 |

TABLE V

Volumes (% of Control) of Breads Produced from (10 − x) Grams of European Wheat Flour (Samples 11), and x Grams of Rye Water Soluble (RWS) Extract Isolated from Rye Wholemeal or its Milling Fractions According to Procedure G

| Quantity of Flour (Grams) | Isolation of RWS | Quantity of RWS (Grams) | Volume (%) |
|---|---|---|---|
| 10.0 | — | 0.0 | 100.0 |
| 9.9 | wholemeal | 0.1 | 103.3 |
| 9.8 | wholemeal | 0.2 | 106.9 |
| 9.9 | B-fraction | 0.1 | 97.6 |
| 9.8 | B-fraction | 0.2 | 101.2 |
| 9.9 | C-fraction | 0.1 | 102.7 |
| 9.8 | C-fraction | 0.2 | 103.1 |
| 9.9 | shorts | 0.1 | 107.7 |
| 9.8 | shorts | 0.2 | 117.6 |
| 9.9 | bran | 0.1 | 106.2 |
| 9.8 | bran | 0.2 | 116.0 |

TABLE VI

Volumes (% of Control) of Breads Produced from 10.0 or 9.8 Grams of North American Wheat Flour (Sample 12), 0 or 0.2 Grams of Rye Water Soluble (RWS) Extract Isolated According to Procedure A and Variable Levels of Potassium Bromate (in ppm)

| Flour (Grams) | RWS (Grams) | $KBrO_3$ (ppm) | Volume (%) |
|---|---|---|---|
| 10.0 | 0.0 | 0 | 100.0 |
| 9.8 | 0.2 | 0 | 107.5 |
| 10.0 | 0.0 | 10 | 103.4 |
| 9.8 | 0.2 | 10 | 112.2 |

TABLE VII

Loaf Volumes (in cc) and Crumb Grain of Breads Produced from 100 g of North American Wheat Flour (sample 13) by the Procedure of Finney (1984) in the Presence or Absence of Several Additives Including Catalase (1.4 × $10^5$ Sigma Units)

| Additive | Catalase | Loaf Volume | Crumb Grain |
|---|---|---|---|
| — | − | 947 | Underoxidized |
| — | + | 930 | Underoxidized |
| Calcium peroxide 20 ppm | − | 975 | Optimum |
| Calcium peroxide 20 ppm | + | 940 | Underoxidized |
| Potassium Bromate 20 ppm | − | 982 | Optimum |
| Potassium Bromate | + | 987 | Optimum |
| Azodicarbonamide 10 ppm | − | 995 | Optimum |
| Azodicarbonamide 10 ppm | + | 998 | Optimum |
| Ascorbic acid 50 ppm | − | 983 | Optimum |
| Ascorbic acid 50 ppm | + | 987 | Optimum |
| Procedure G rye water solubles (2%) | | 1067 | Optimum |
| Procedure G rye water solubles (2%) | | 1055 | Optimum |

References

The following references, some of which are specifically referred to herein, are incorporated by reference.

A.A.C.C. Method 10–10B, Methods of Analysis. American Association of Cereal Chemists, St. Paul, Minn.

Belitz, H.D.; Grosch, W. Food Chemistry. Springer Verlag, Berlin, 1986.

Casier, J. P. J.; Soenen, M. Die wasserunloslichen Pentosane aus Roggen und Weizen und ihr Einfluss auf die Backwerte. Getreide Mehl Brot, 1967, 17:46.

Casier, J. P. J.; De Paepe, G.; Brummer, J.-M. Einfluss der wasserunlaslichen Weizen- und Roggenpentosane aug die Backeigenschaften yon Weizenmehlen und anderen Rohstoffen. Getreide Mehl Brot, 1973, 27:36.

Casier, J. P. J. British Patent, 1973, 1 332903.

Delcour, J. A.; Vanhamel, S.; De Geest, C. Physico-chemical and functional properties of rye nonstarch polysaccharides. I. Colorimetric analysis of pentosans and their relative monosaccharide compositions in fractionated (milled) rye products. Cereal Chemistry, 1989, 66:107.

Finney, K. F.; Shogren, M. D. A ten-gram mixograph for determining and predicting functional properties of wheat flours. Baker's Digest, 1972, 46(2):32.

Finney, K. F. An optimized straight dough breadmaking procedure after 44 years. Cereal Chemistry, 1984, 61:20.

Hoseney, R. C. Principles of Cereal Science and Technology. American Association of Cereal Chemists, St. Paul, 1994.

Joergensen, H. Studies on the nature of the bromate effect, Humphrey Milford, Oxford University Press, London, 1945.

Kuninori, T.; Matsumoto, H. Dehydro-L-ascorbic acid reducing system in flour. Cereal Chemistry, 1964a, 41:39.

Kuninori, T.; Matsumoto, H. Glutathione in wheat and wheat flour. Cereal Chemistry, 1964b, 41:252.

Lai, C. S.; Hoseney, R.C.; Davis, A. B. Functional effects of shorts in breadmaking. Cereal Chemistry, 1989, 66:220.

Shogren, M. D.; Finney, K. F. Breadmaking test for 10 grams of flour, Cereal Chemistry, 1984, 61:418.

Vanhamel, S.; Van den Ende, L.; Darius, P. L.; Delcour, J. A. A volumeter for breads prepared from 10 grams of flour. Cereal Chemistry, 1991, 68:170.

We claim:

1. A bread dough comprising respective amounts of wheat flour, water and yeast and further including a bread improver comprising a water soluble alkaline proteinaceous fraction derived from rye by aqueous extraction from rye and anion exchange chromatographic separation of the extractant, said fraction having a pI greater than about 7.5, said bread improver giving at least about a 2% increase in loaf volume when tested at a level of up to about 6% baker's weight in accordance with A.A.C.C. Test 10–10B.

2. The bread dough of claim 1, said improver being present at a level of up to about 6% by weight, based upon the amount of wheat flour in said dough taken as 100% by weight.

3. The bread dough of claim 2, said improver being present at a level of from about 0.1–4% by weight, based upon the amount of wheat flour in said dough taken as 100% by weight.

4. The bread dough of claim 1, said loaf volume increase being greater than about 5%.

5. The bread dough of claim 1, said proteinaceous fraction being an aqueous mixture of a plurality of rye-derived proteinaceous species.

6. Baked bread derived from baking the dough of claim 1.

7. A method of preparing a bread improver comprising the steps of:

providing a quantity of rye meal;

contacting said rye meal with sufficient water to form a rye meal-water mixture;

extracting from said rye meal-water mixture a water soluble alkaline proteinaceous fraction having a pI of greater than about 7.5 and being effective for improving bread dough, said extracting step comprising anion exchange chromatographic separation; and recovering said proteinaceous fraction as said bread improver, the bread improver giving at least about a 2% increase in loaf volume when tested at a level of up to about 6% baker's weight in accordance with A.A.C.C. Test 10–10B.

8. The method of claim 7, wherein said rye meal has a fine grind.

9. The method of claim 7, wherein the water in said step of contacting is in the amount from about 2–10 liters of water per kg of rye meal.

10. The method of claim 9, wherein said amount of water is from about 2–6 liters of water per kg of rye meal.

11. The method of claim 7, wherein said contacting step further comprises the step of agitating said mixture of water and rye meal.

12. The method of claim 11, wherein said agitation is carried out for a period of from about 1–6 hours.

13. The method of claim 11, further comprising the step of centrifuging said mixture after said agitation to obtain a supernate.

14. The method of claim 13, further comprising the step of filtering said supernate.

15. The method of claim 7, wherein said recovering step further comprises the steps of separating positively charged, rye-derived proteinaceous species from said mixture.

16. The method of claim 15, further comprising the step of subjecting the water fraction of said mixture to isoelectric focusing.

* * * * *